(12) United States Patent
Hemminki et al.

(10) Patent No.: US 10,248,244 B2
(45) Date of Patent: Apr. 2, 2019

(54) DEVICE OPERATED THROUGH OPAQUE COVER AND SYSTEM

(71) Applicant: MICROSOFT TECHNOLOGY LICENSING, LLC, Redmond, WA (US)

(72) Inventors: Toni Hemminki, Tampere (FI); Teemu Rämö, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 14/509,813

(22) Filed: Oct. 8, 2014

(65) Prior Publication Data
US 2016/0103546 A1    Apr. 14, 2016

(51) Int. Cl.
| | | |
|---|---|---|
| *G06F 1/16* | (2006.01) | |
| *G06F 3/041* | (2006.01) | |
| *H04M 1/725* | (2006.01) | |
| *G06F 3/0488* | (2013.01) | |

(52) U.S. Cl.
CPC .......... *G06F 3/0416* (2013.01); *G06F 1/1632* (2013.01); *G06F 1/1643* (2013.01); *G06F 3/0488* (2013.01); *H04M 1/72527* (2013.01); *H04M 1/72575* (2013.01); *G06F 2200/1634* (2013.01); *G06F 2203/04107* (2013.01); *H04M 2250/22* (2013.01)

(58) Field of Classification Search
None
See application file for complete search history.

(56) References Cited

U.S. PATENT DOCUMENTS

| | | | |
|---|---|---|---|
| 6,535,199 B1 | 3/2003 | Canova et al. | |
| 7,324,642 B2 | 1/2008 | Pletikosa | |
| 2006/0181154 A1* | 8/2006 | Ratner | H03K 17/962 307/116 |
| 2007/0222765 A1* | 9/2007 | Nyyssonen | G06F 1/1607 345/173 |
| 2011/0248838 A1 | 10/2011 | Krahenbuhl et al. | |
| 2011/0316784 A1* | 12/2011 | Bisutti | G06F 1/1626 345/168 |
| 2013/0181935 A1 | 7/2013 | Mckenzie et al. | |

(Continued)

FOREIGN PATENT DOCUMENTS

| | | |
|---|---|---|
| CN | 203522828 U | 4/2014 |
| CN | 203691478 U | 7/2014 |
| EP | 1198110 A2 | 4/2002 |
| FR | 2836319 A1 | 8/2003 |

OTHER PUBLICATIONS

"International Search Report & Written Opinion Issued in PCT Application No. PCT/US2015/054352", dated Dec. 23, 2015, 12 Pages.

(Continued)

*Primary Examiner* — Matthew Yeung

(57) ABSTRACT

A device comprising a touch sensing element and a processing unit is provided. The device has one or more cover operation modes. The processing unit is adapted to activate one of the cover operation modes of the device when a non-conductive opaque cover element is applied to the device, and the device is adapted to be operated via the touch sensing element through the non-conductive opaque cover element when the cover operation mode of the device is active. A system comprising a device and a cover element is provided. A method for controlling a device comprising a touch sensing element is also provided.

17 Claims, 4 Drawing Sheets

(56) References Cited

U.S. PATENT DOCUMENTS

| | | | | |
|---|---|---|---|---|
| 2013/0342492 | A1* | 12/2013 | Uttermann | G06F 3/03547 345/173 |
| 2014/0104160 | A1 | 4/2014 | Eriksson et al. | |
| 2014/0198070 | A1 | 7/2014 | Won | |
| 2014/0268517 | A1* | 9/2014 | Moon | H05K 7/00 361/679.01 |
| 2014/0282059 | A1* | 9/2014 | Oh | G06F 1/1641 345/173 |
| 2015/0154935 | A1* | 6/2015 | Won | G09G 5/006 345/156 |

OTHER PUBLICATIONS

Gaurav, "Touch sensitive iPhone 5/5S Moshi Sensecover flip cover case preserves your smartphone", Published on: Aug. 18, 2014, Available at: http://www.damngeeky.com/2014/01/30/17989/touch-sensitive-iphone-55s-moshi-sensecover-flip-cover-case-preserves-your-smartphone.html.

Judd, William, "LG G3 QuickCircle Qi Wireless Charging Cover arrives in stock", Published on: Jul. 28, 2014, Available at: http://www.mobilefun.co.uk/blog/2014/07/lg-g3-quickcircle-qi-wireless-charging-cover-arrives-in-stock/.

Passary, Annu, "CES 2013 Highlights: Top 10 Gadgets That Grabbed Eyeballs", Published on: Jan. 14, 2013, Available at: http://www.mobilenapps.com/articles/6430/20130114/ces-2013-highlights-top-10-gadgets-grabbed-eyeballs.htm.

"International Preliminary Report on Patentability Issued in PCT Application No. PCT/US2015/054352", dated Jan. 26, 2017, 9 Pages.

"SecondWritten Opinion Issued in PCT Application No. PCT/US2015/054352", dated Oct. 31, 2016, 6 Pages.

* cited by examiner

DEVICE OPERATED THROUGH OPAQUE COVER AND SYSTEM

BACKGROUND

Existing covers for devices with touch sensors such as smart phones and tablets are available in a wide variety. The covers or cases are usually removable, and devices can be configured to enter a "lock mode" when a cover is applied (closed). Some covers do not cover the touch sensor of the device, and some are transparent to light. So-called smart covers can be used to provide limited interactivity with devices when they are attached. A cover can be electrically connected to the device and have a processor of its own.

The embodiments described below are not limited to implementations which solve any or all of the disadvantages of known devices and covers.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A device, system and method are presented. The device comprises a touch sensing element and a processing unit, and is adapted to enter one or more cover operation modes when a cover element is applied. When in cover operation mode, the device can then be operated via the touch sensing element through the cover element. The system comprises a device with a touch sensing element and a removable non-conductive opaque cover element. In the system, when the cover element is applied to the device, the cover element covers at least part of the touch sensing element, and the device can be operated via the touch sensing element through the cover element.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a handheld device, the device described is provided as an example and not a limitation. As those skilled in the art will appreciate, the present examples are suitable for application in a variety of devices comprising a touch sensing element, e.g. in laptops, smartwatches personal computers and computer accessories.

Figure 1A:
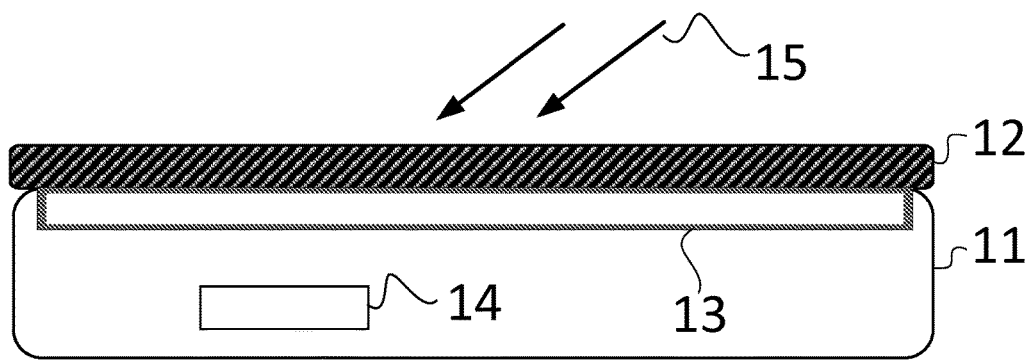
FIG. 1a is a schematic diagram of a device with a cover element applied.

FIG. 1a shows a device 11 with a non-conductive opaque cover element 12 applied. This figure is a cross section of the device 11 viewed from the side. "Opaque" means that at least a significant amount of light is blocked, which makes it hard or impossible for a user to see through the cover. The device 11 comprises a touch sensing element 13 and a processing unit 14. The touch sensing element 13 can be, for example, a capacitive touch sensor, an active stylus sensor or an Electro-Magnetic Resonance sensor. The device 11 may also comprise a display (not shown separately on the figure). The display may be a part of the touch sensing element 13, or it may be aligned with the touch sensing element 13 so as to form a touch screen. The device 11 has one or more cover operation modes, and the processing unit 14 is adapted to activate one of these cover operation modes when the cover element 12 is applied. The processing unit 14 may be adapted to activate a cover operation mode upon identifying that the cover element 12 is applied. This identification may be based on at least one of the following: one or more mechanical switches that are activated when the cover element 12 is applied; a magnet and/or sensing element, for example a Hall sensor; visual cues picked up with an optical sensor such as a camera, an ambient light sensor, proximity sensor, or dedicated optical sensor; proximity of the cover element 12 measured by an optical proximity sensor; conductive patterns on the cover element 12 detected with the touch sensing element 13. Embodiments are not limited to the identification types listed.

When the cover operation mode of the device is active, the device 11 is adapted to be operated via the touch sensing element 13 through the cover element 12. The arrows 15 on FIG. 1a show an example of an area from which input can be received through the cover element 12. As it is clear to a skilled person, the representation of elements on FIG. 1a (as well as other figures) is only schematic and none of the elements are limited to the shape and size shown on the figures. For example, the processing unit 14 may be of any size and positioned anywhere in or on the device 11; the touch sensing element 13 can have a different shape and be located on other parts of the device 11.

In an embodiment, the device 11 is adapted to identify a type of the non-conductive opaque cover element 12. The processing unit 14 is adapted to select a cover operation mode of the device 11 based on the identified type and activate the selected operation mode when the cover element 12 is applied to the device 11. The device 11 may store any number of identifiers for different types of the cover element 12, and the processing unit 14 may be adapted to use these identifiers to recognize the cover element type. This may alleviate the need to select cover modes manually.

In an embodiment, the device 11 is adapted to receive user input for selecting a cover operation mode, and the processing unit 14 is adapted to activate the selected cover operation mode of the device when the cover element 12 is applied to the device 11. For example, a user may select the preferred cover mode regardless of the type of the cover element 12.

In an embodiment, the device 11 may be adapted to receive user input for customizing the cover operation modes. In other words, the user may customize the cover operation modes manually or using predetermined parameters, for example customization tools or presets. This can provide more flexibility in the interaction with the device 11 in cover operation mode.

Figure 1B:
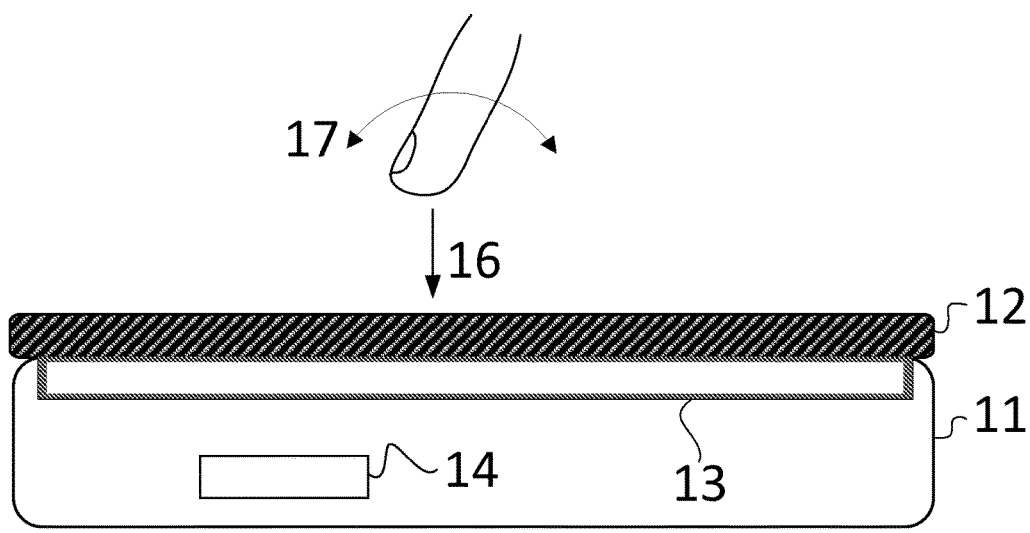
FIG. 1b is a schematic diagram of a device operated through an applied cover element.

FIG. 1b shows a device 11 with a non-conductive opaque cover element 12 applied. Similar to FIG. 1a, the device 11 is adapted to be operated via the touch sensing element 13 through the cover element 12. The touch sensing element 13 may be adapted to detect user input in form of a touch 16, gesture and/or hover 17. Even though a finger is shown on FIG. 1b, it is clear to a skilled person that any alternative input objects can be used, for example a stylus or a pen. A touch 16 is not limited to direct physical contact and may also refer to proximity of an object sufficient for the touch sensing element 13 to detect a touch 16. A hover 17 refers to e.g. capacitive sensing in proximity of the device 11, and the touch sensing element 13 may be adapted to detect a position of the input object in all three dimensions in proximity of the device 11. Hover 17 can be based on self-capacitance measurement of the touch sensing element 13. A gesture may be, without limitation, a pinch, a swipe, a sweep or palm covering. The device 11 may comprise a user interface (not shown in the figures) which in turn comprises one or more functions. These functions may include, for example, receiving or rejecting calls, one or more multimedia functions, volume controls and others. The processor can be adapted to cause the device to perform at least one of the functions based on the detected user input in form of touch, gesture and/or hover.

A device 11 as described above can have the effect of operability without removing the cover element 12. This can keep the device 11 protected from damage and, for example, from water. Such device 11 can be used, for example, in the rain without the risk of permanent damage. If the device 11 has a display, the embodiments described above may provide the effect of reduced power consumption by a device 11 in the cover operation mode, combined with operability through an opaque non-conductive cover 12. This is in part because when the device 11 is in cover operation mode, the touch sensing element 13 is active while the display may be turned off or in a power saving mode.

Figure 2A:
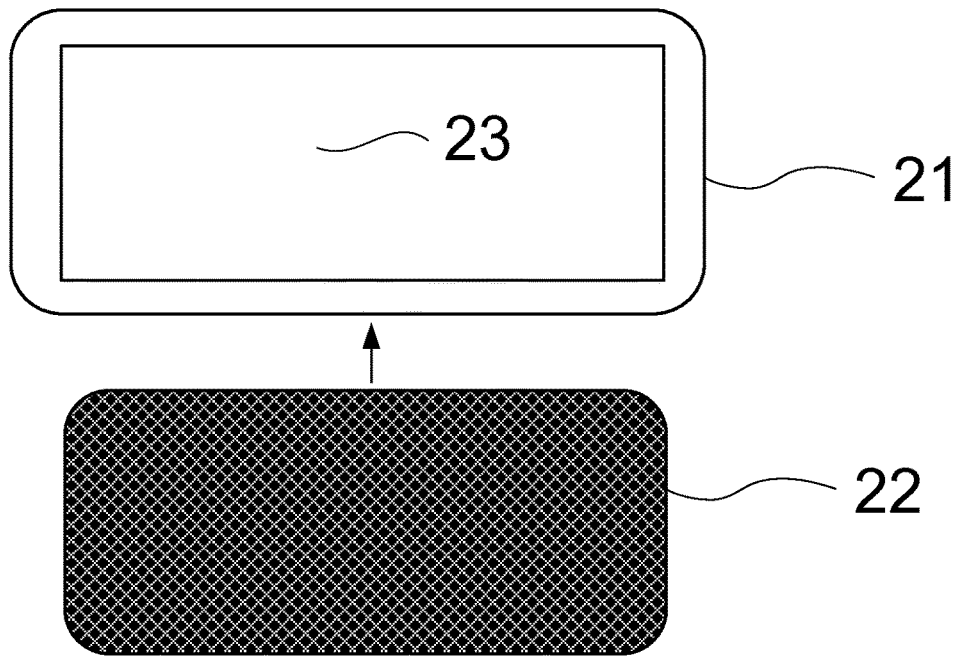
FIG. 2a is a schematic diagram of a system comprising a device and a cover element.
Figure 2B:
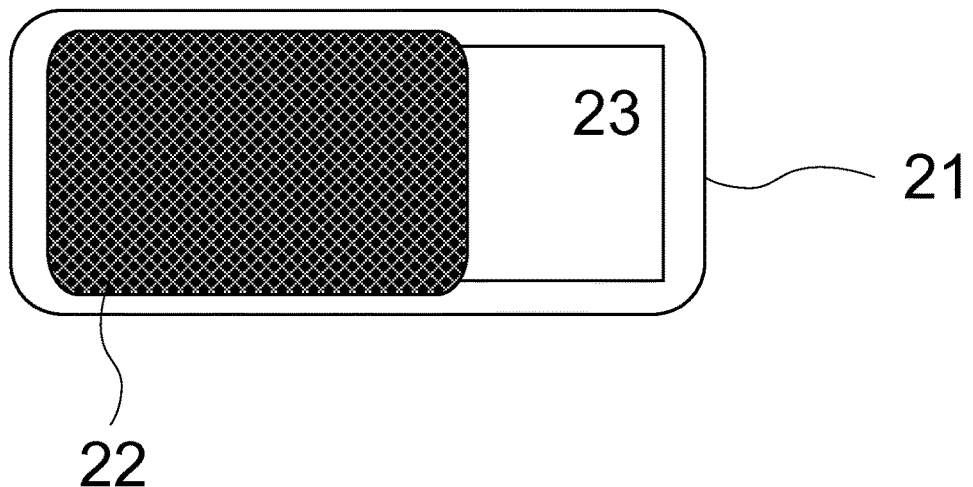
FIG. 2b is a schematic diagram showing a system wherein a cover element covers part of the touch sensing element of a device.

A system is schematically shown on FIGS. 2a and 2b. The system may be, for example, a device control system. The system comprises a device 21 and a removable non-conductive opaque cover element 22. The device 21 comprises a touch sensing element 23. The device 21 may also comprise a display element which may be aligned with a touch sensor 23 to form a touch screen. The device 21 may be like the device 11 described above in relation to FIGS. 1a-1b. The cover element 22 is shown removed from the device 21 in FIG. 2a to illustrate the possibility to separate one from another. When applied to the device 21, the cover element 22 is adapted to cover at least part of the touch sensing element 23 of the device 21. The cover element 22 may be applied by various means, for example (but not limited to) using a magnet, by tightly securing the cover element 22 over the device 21, or with one or more hinges. The system shown in FIG. 2b is an example where the cover element 22 only covers part of the touch sensing element 23. Alternatively, the cover element 22 may cover the whole area of the touch sensing element 23. The device 21 may have a cover operation mode which is activated when the cover element 22 is applied to at least part of the touch sensing element 23. The device 21 is adapted to be operated via the touch sensing element 23 through the non-conductive opaque cover element 22. Input detected by the touch sensing element 23 can include touch, gesture and/or hover. In an embodiment, the device 21 has a user interface (not shown on the Figures) which comprises one or more functions for operating the device 21 through the removable non-conductive opaque cover element 22 when said cover element 22 is applied to the device 21.

The cover element 22 may also cover at least partially the sides and/or the back part of the device. The touch sensing element 23 may also extend to the sides and/or the back part of the device. It is clear to a skilled person that the touch sensing element 23 shown on FIGS. 2a-2b covers the approximate area of a display of the device for exemplary purposes only, and embodiments are not limited to this layout.

In the embodiments described above, different types of a removable non-conductive opaque cover element 22 can be used. The cover element 22 may be made of inexpensive materials, or an existing non-conductive opaque cover may be used. The opaque and non-conductive cover element 22 described in the above embodiments may not require an electrical connection to the device 21, i.e. no need wires and connection points in the cover element 23 may provide robustness of the cover element 23 and reliability of the system.

Figure 2C:
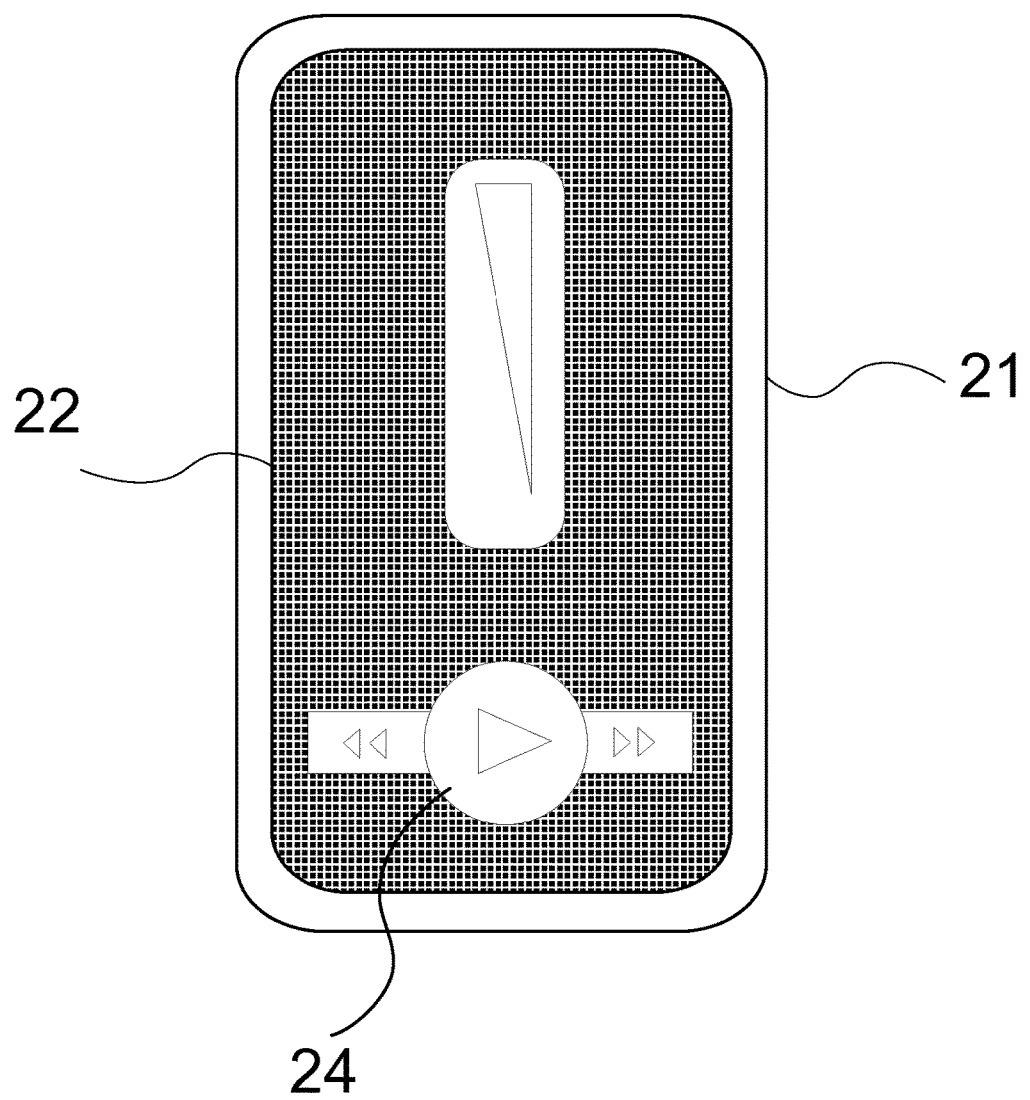
FIG. 2c is a schematic diagram of a system wherein functions of the user interface of a device are visualized on the cover element.

FIG. 2c shows an example of a system in which functions 24 of a user interface of the device 21 are visualized on the removable non-conductive opaque cover element 22. In this example, the functions 24 include multimedia functions such as "play", "change track" and "volume". However, these functions are presented for exemplary purposes only, and it will be appreciated by a person skilled in the art that alternative or additional functions may be visualized on the cover element 22. Visualization of one or more functions 24 of a user interface of the device 21 may refer to printing, drawing, stitching, engraving, embossing, stamping, applying stickers, and surface texturing (e.g. for tactile & visual feedback). Certain non-conductive materials may be used locally on the cover element 22 to introduce materials that look or feel differently to a user. Visualization of the functions may be done on visible parts of the cover element 22.

In an embodiment, the device 21 and the cover element 22 may comprise connection interfaces (not visible in the figures). These interfaces may be wireless or electrical connection interfaces. When the cover element 22 is applied to the device 21, they are adapted to connect with each other via the connection interface. The removable non-conductive opaque cover element 22 may then include a display element, and for example a processing unit of its own. The display element may be, but is not limited to, an electronic ink display. In an embodiment, the cover element 22 also comprises a user interface of its own. The user interface of the cover element can be adapted to send instructions to the device. In an embodiment, user interfaces of the device 21 and the cover element 22 may be synchronized and/or have interoperability.

Figure 3:
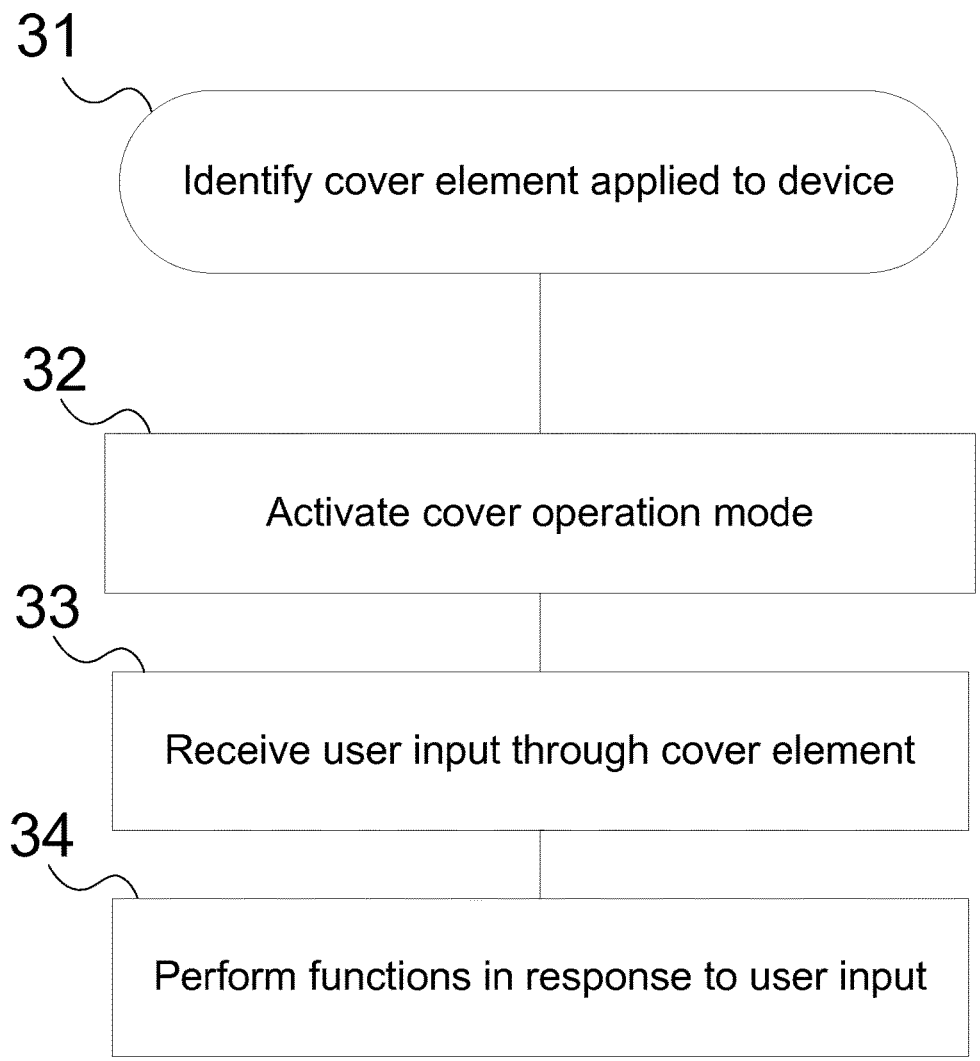
FIG. 3 is a flow chart of a method for controlling a device. Like reference numerals are used to designate like parts in the accompanying drawings.

FIG. 3 shows a method for controlling a device comprising a touch sensing element. The device may be, for example, as described above in relation to FIGS. 1a-1b. The method starts with 31 identifying a non-conductive opaque cover element applied to at least part of the touch sensing element of the device. When the cover element is identified, a cover operation mode of the device is activated in 32. After this, the device is ready to receive user input through the non-conductive opaque cover element applied to at least part of the touch sensing element of the device. User input may be received in form of touch, gesture and/or hover. When the user input is received in 33, at least one function of the cover operation mode of the device is performed in response to the received user input, as indicated by 34.

In an embodiment, the method further comprises providing feedback to a user upon receiving user input and/or upon performing at least one function.

The methods according to the embodiments above may provide the technical effect of power saving because when this method is used to control the device, the display may switched off or in power saving mode. The method also makes interaction with the device easier for the user because force does not need to be applied to provide input, and different gestures can be used.

According to an embodiment, a device comprising a touch sensing element and a processing unit is provided. The device has one or more cover operation modes. The processing unit is adapted to identify a non-conductive opaque cover element applied to at least part of the touch sensing element of the device, and to activate one of the cover operation modes of the device, and the device is adapted to be operated via the touch sensing element through the non-conductive opaque cover element when the cover operation mode of the device is active.

In an embodiment, the device may comprise a display element. In an embodiment, the display element is aligned with the touch sensing element so as to form a touch screen.

In an embodiment, the device according to any of the previously mentioned embodiments is adapted to identify a type of the non-conductive opaque cover element. The processing unit is adapted to select a cover operation mode of the device based on the identified type and activate the selected cover operation mode of the device when the non-conductive opaque cover element is applied to the device.

In an embodiment, the device according to any of the previously mentioned embodiments is adapted to receive user input for selecting a cover operation mode of the device. The processing unit is adapted to activate the selected cover operation mode of the device when the non-conductive opaque cover element is applied to the device.

In an embodiment, the device according to any of the previously mentioned embodiments is adapted to receive user input for customizing the one or more cover operation modes of the device.

In an embodiment, the touch sensing element of the device according to the previously mentioned embodiments is adapted to detect user input in form of touch, gesture and/or hover. An embodiment of the device comprises a user interface activated in the cover operation mode of the device, wherein the user interface comprises one or more functions. The processor is adapted to cause the device to perform at least one of the functions based on the detected user input in form of touch, gesture and/or hover. In an embodiment, the functions of the user interface comprise one or more multimedia functions.

According to an embodiment, a system is disclosed. The system comprises: a device comprising a touch sensing element, and a removable non-conductive opaque cover element which is adapted to be applied to the device. When said cover element is applied to the device, the non-conductive opaque cover element is adapted to cover at least part of the touch sensing element, and the device is adapted to be operated via the touch sensing element through the non-conductive opaque cover element.

In an embodiment, the touch sensing element is adapted to detect user input in form of touch, gesture and/or hover.

In an embodiment of the system as mentioned in any of the embodiments above, the device comprises a display element.

In an embodiment of the system as mentioned in any of the embodiments above, the device comprises a user interface comprising one or more functions for operating the device through the removable non-conductive opaque cover element when said cover element is applied to the device.

In an embodiment of the system as described in any of the embodiments above, at least one of the functions of the user interface is visualized on the surface of the cover element.

In an embodiment of the system as described in any of the embodiments above, the device and the removable non-conductive opaque cover element comprise connection interfaces. When the cover element is applied to the device, the cover element is connected to the device via the connection interface.

According to an embodiment, a method is disclosed. The method comprises: identifying a non-conductive opaque cover element applied to at least part of the touch sensing element of the device, activating a cover operation mode of the device upon identification of the cover element, receiving user input through the non-conductive opaque cover element applied to at least part of the touch sensing element of the device, and performing at least one function of the cover operation mode of the device in response to the received user input.

According to an embodiment, receiving user input comprises receiving user input in form of touch, gesture and/or hover.

In an embodiment, the method further comprises providing feedback to a user upon receiving user input and/or upon performing at least one function of the cover operation mode of the device.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising:
a display element;
a touch sensing element, wherein the display is aligned with the touch sensing element so as to form a touch screen; and
a processing unit that detects a non-conductive opaque cover element applied to the device such that the whole area of the touch screen formed by the display element and the touch sensing element are covered and non-visible through the non-conductive opaque cover element, identifies a cover type of the non-conductive opaque cover element based on a plurality of stored identifiers for a plurality of cover types, selects a cover operation mode from a plurality of stored cover operation modes based on the detected non-conductive opaque cover element and the identified cover type, and activates the selected cover operation mode, wherein the touch sensing element is active and the display element is switched off or is in power saving mode, the activated cover operation mode providing operability of the device via user input detected by the touch sensing element through the non-conductive opaque cover element, the user input including gestures.

2. The device of claim 1 further comprising:
a user interface activated in the selected cover operation mode of the device, the user interface comprising one or more functions, the one or more functions corresponding to one or more visualizations implemented on the non-conductive opaque cover element via surface texturing; and
the processing unit performing at least one of the one or more functions based on the detected user input through at least one of the one or more visualizations implemented on the non-conductive opaque cover element.

3. The device of claim 1 wherein responsive to receiving user input selecting another cover operation mode, the processing unit activates the selected other cover operation mode for the non-conductive opaque cover element applied to the device.

4. The device of claim 1 wherein the processing unit further customizes one or more cover operation modes of the plurality of cover operation modes in response to user input.

5. The device of claim 1 wherein the touch sensing element detects the user input through the non-conductive opaque cover element via at least one of touch, gesture or hover.

6. The device of claim 5 further comprising:
a user interface activated in the cover operation mode of the device, the user interface comprising one or more functions, the processing unit performing at least one of the one or more functions based on the detected user input through the non-conductive opaque cover element.

7. The device of claim 6, wherein the one or more functions of the user interface comprise one or more multimedia functions.

8. A system comprising:
a removable non-conductive opaque cover element that receives at least one of a touch, gesture, or hover of a user input corresponding to a touch sensing display device, wherein the touch sensing display device detects the user input through the removable non-conductive opaque cover element as a touch sensing element is active and a display element is switched off or is in power saving mode and as the removable non-conductive opaque cover element covers a whole area of the touch sensing display device and renders the display element of the touch sensing display device non-visible;
a connection interface that provides communication between the removable non-conductive opaque cover element and the touch sensing display device; and
a user interface that sends instructions to the touch sensing display device via the connection interface upon application of the removable non-conductive opaque cover element to the couch sensing display device wherein the system further comprises identifying a type of the non-conductive opaque cover element applied using a number of stored identifiers associated with different types of cover elements.

9. The system of claim 8 wherein the instructions sent by the user interface of the removable non-conductive opaque cover element to the associated device include a cover type identifier, the cover type identifier used by the associated device to select a cover operation mode corresponding to the removable non-conductive opaque cover element.

10. The system of claim 8 wherein the removable non-conductive opaque cover element further comprises a display element.

11. The system of claim 8 wherein the removable non-conductive opaque cover element further comprises one or more representations of one or more functions for operating the associated device through the removable non-conductive opaque cover element.

12. The system of claim 11 wherein at least one of the one or more functions is visualized on the removable non-conductive opaque cover element.

13. The system of claim 8 wherein the removable non-conductive opaque cover element further comprises:
a processing unit; and
a display element comprising an electronic ink display.

14. The system of claim 8 wherein the user interface of the removable non-conductive opaque cover element comprises interoperability with a user interface of the touch sensing display device.

15. The system of claim 8 wherein the user interface of the removable non-conductive opaque cover element is synchronized with a user interface of the touch sensing display device.

16. A method for controlling a display device comprising a touch sensing element, the method comprising:
detecting, by a device processing unit, a non-conductive opaque cover element applied to the display device, the non-conductive opaque cover element covering an entirety of a display element of the display device such that the display element is non-visible through the non-conductive opaque cover element, the display element aligned with the touch sensing element so as to form a touch screen;
identifying a type of the detected non-conductive opaque cover element applied using a number of stored identifiers associated with different types of cover elements;
selecting a cover operation mode from a plurality of cover operation modes based on the identified type of non-conductive opaque cover element;
activating the selected cover operation mode;
receiving user input via a gesture corresponding to the touch sensing element through the non-conductive opaque cover element, wherein the touch sensing element is active and the display element is switched off or is in power saving mode; and
performing at least one function of the activated cover operation mode in response to the received user input.

17. The method of claim 16 further comprising:
providing feedback to a user upon receiving the user input and performing at least one function of the activated cover operation mode of the display device.

* * * * *